United States Patent [19]

Janowicz

[11] Patent Number: 4,728,180
[45] Date of Patent: Mar. 1, 1988

[54] REAR VIEW MIRROR WITH TWO MIRRORS JOINED BY PIVOT MEANS COVERED BY A HOUSING

[76] Inventor: Miroslaw Janowicz, Schöneberg Feurigstrasse 46, 1000 Berlin 62, Fed. Rep. of Germany

[21] Appl. No.: 891,149

[22] Filed: Jul. 31, 1986

[30] Foreign Application Priority Data

Jan. 10, 1986 [DE] Fed. Rep. of Germany ....... 3600869

[51] Int. Cl.$^4$ .......................... G02B 5/08; G02B 7/18; B60R 1/06; B60R 1/08
[52] U.S. Cl. .................................. 350/626; 350/604; 350/637
[58] Field of Search ............... 350/626, 637, 606, 604, 350/632, 612, 627

[56] References Cited

U.S. PATENT DOCUMENTS

| 384,808 | 6/1888 | Wiederer | 350/626 |
|---|---|---|---|
| 2,582,651 | 1/1952 | Peterson | 350/626 |

FOREIGN PATENT DOCUMENTS

| 2415559 | 9/1979 | France | 350/626 |
|---|---|---|---|
| 145041 | 11/1980 | Japan | 350/604 |
| 57536 | 5/1981 | Japan | 350/604 |
| 120430 | 9/1981 | Japan | 350/626 |
| 194640 | 11/1983 | Japan | 350/604 |

Primary Examiner—Jon W. Henry
Attorney, Agent, or Firm—Krass & Young

[57] ABSTRACT

An outside rearview mirror for vehicles, especially trucks and the like, comprising a main rearview mirror fastened to the vehicle body, an auxiliary mirror stored behind the main mirror, and motor means for swiveling or sliding the auxiliary mirror from its stored position behind the main mirror to a working position adjacent the main mirror and back again. In its working position, the auxiliary mirror provides the driver of the vehicle with an expanded field of view, particularly in the area immediately next to the vehicle and just rearward the mirror.

3 Claims, 11 Drawing Figures

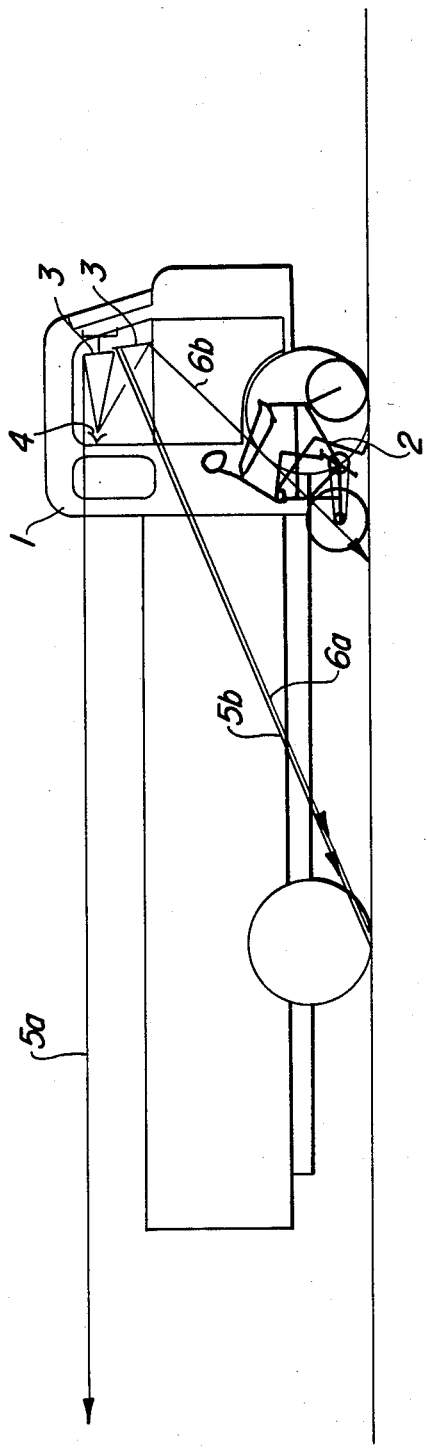

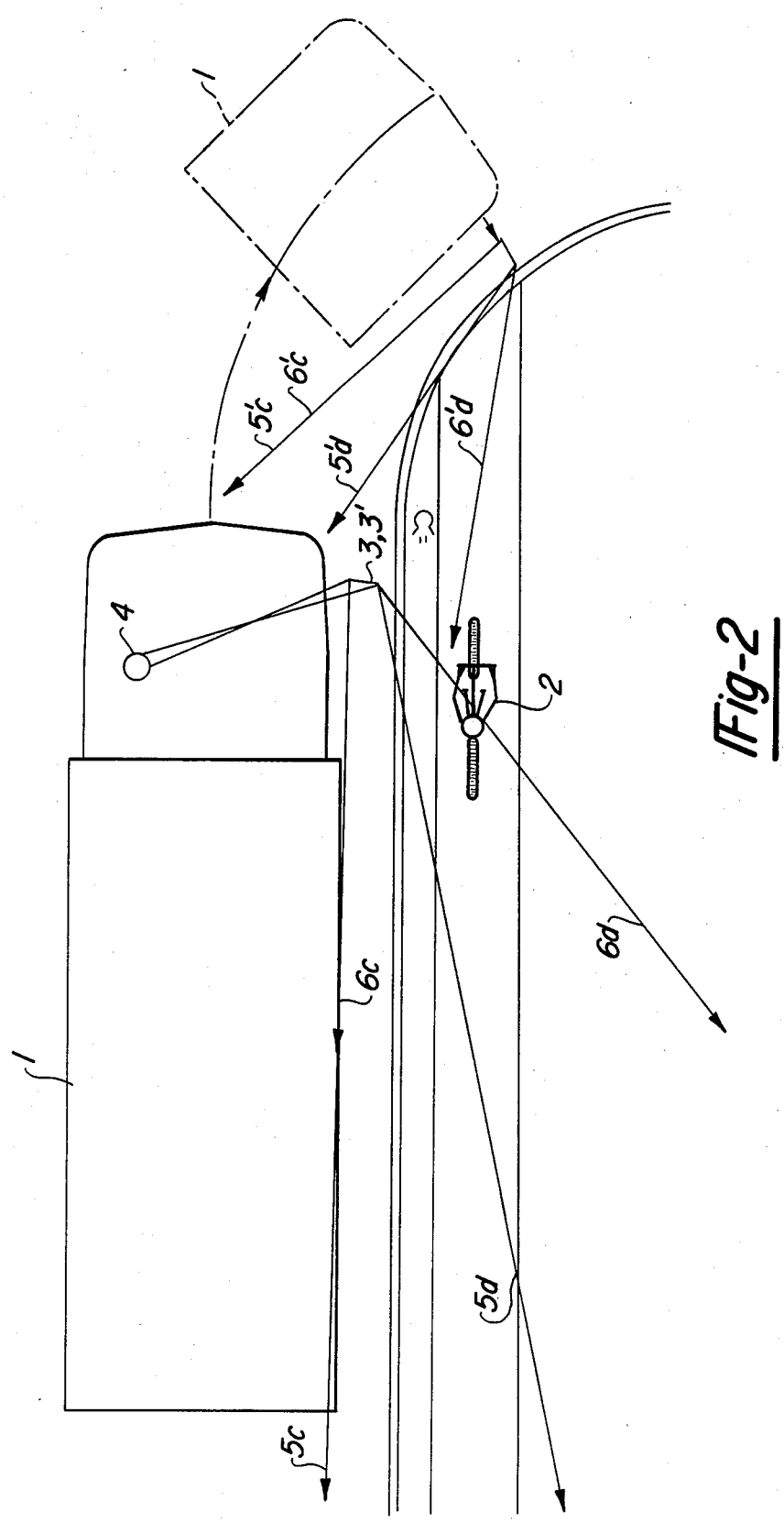

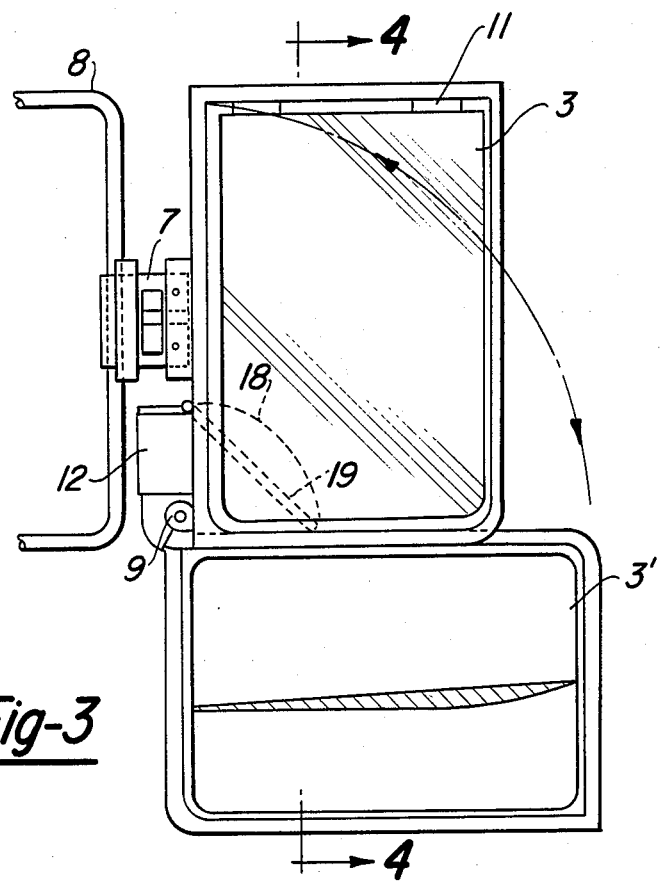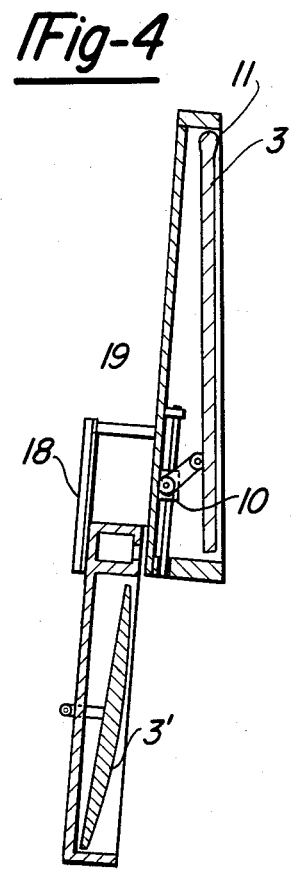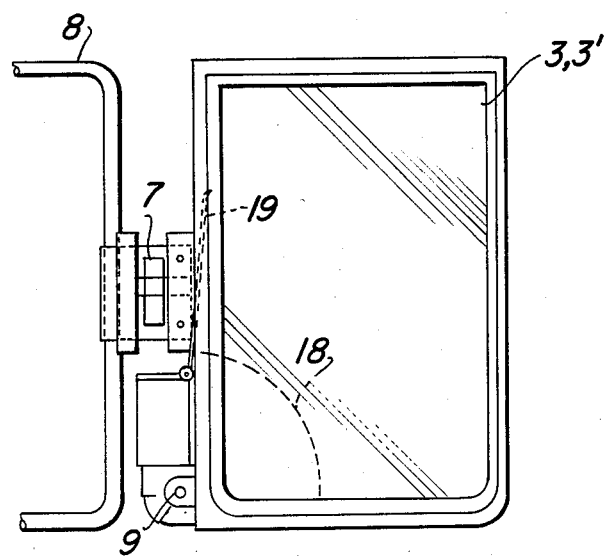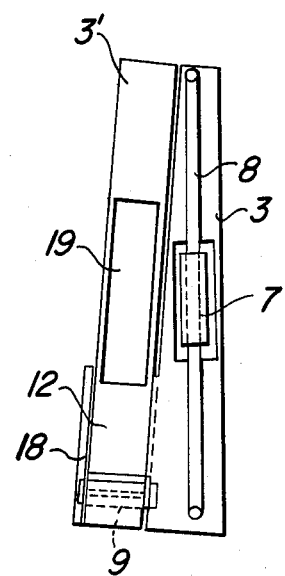

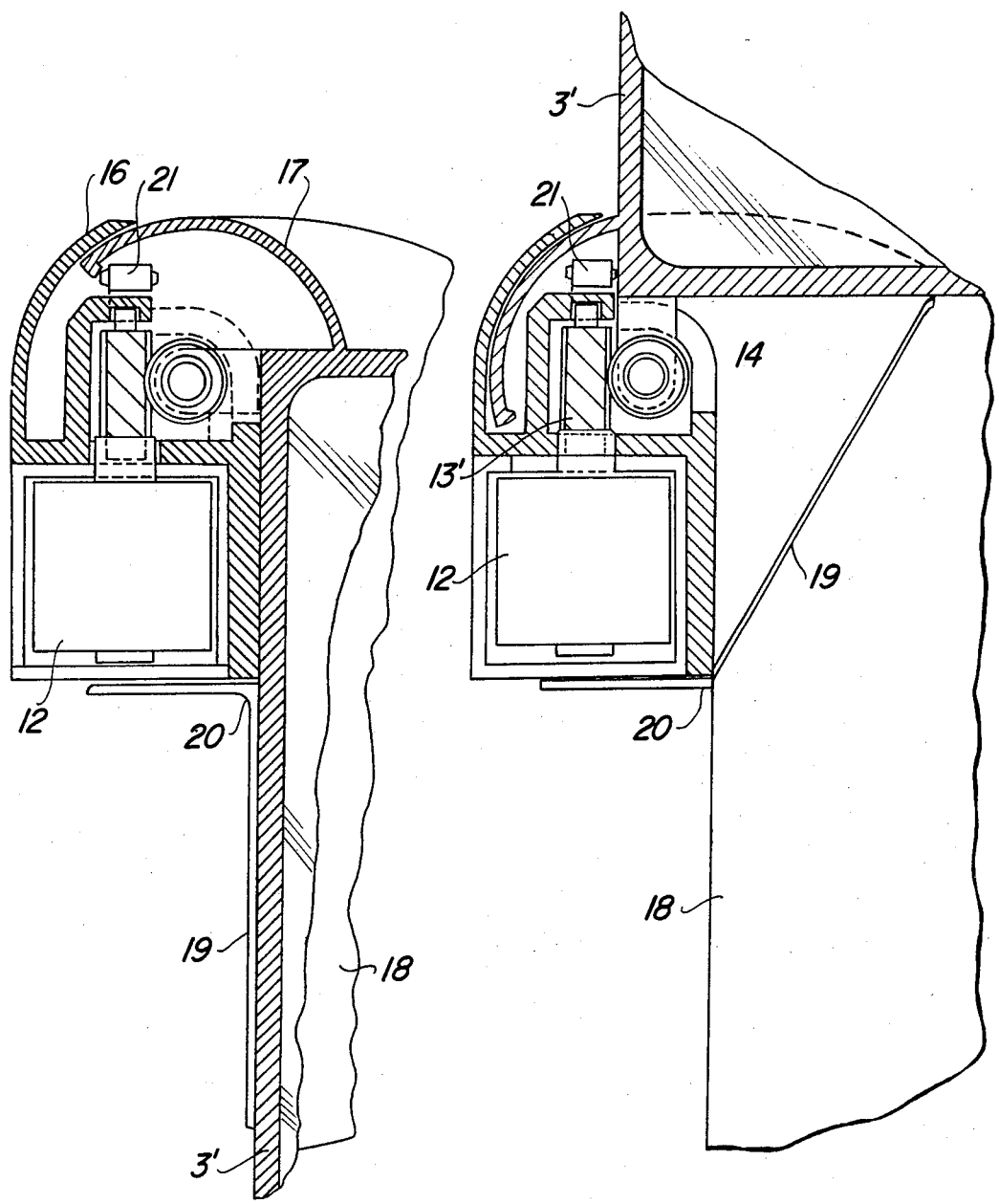

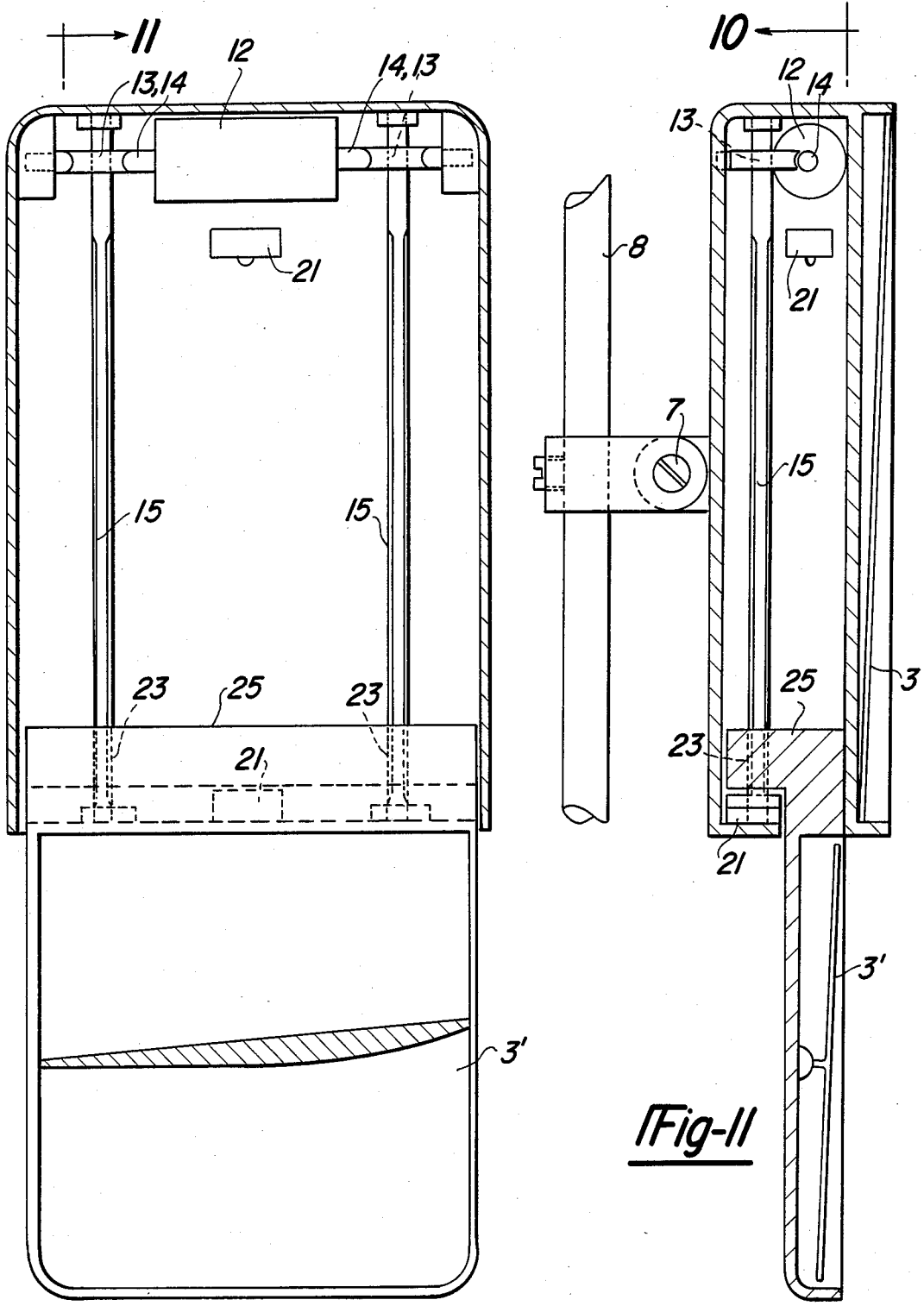

REAR VIEW MIRROR WITH TWO MIRRORS JOINED BY PIVOT MEANS COVERED BY A HOUSING

INTRODUCTION

This invention relates to outside rearview mirrors for vehicles and more particularly to an outside rearview mirror system for trucks in which a driver can adjust his field of view to be able to see the area immediately adjacent the vehicle.

BACKGROUND OF THE INVENTION

In their normal position, outside rearview mirrors leave the driver of a vehicle with a "blind spot." Outside rearview mirrors that are shiftable around a vertical or horizontal axis running parallel to the mirror plane for helping to eliminate these "blind spots" are well-known. However, presently known mirrors can only be shifted in a fairly limited range and, particularly in the case of trucks and other large vehicles, and still do not allow a driver to see low objects that are close to the side of a vehicle and just rearward the mirror. Furthermore, shifting a mirror from its normal position to try and see the blind spot eliminates the driver's normal rear view of the area behind the vehicle.

SUMMARY OF THE INVENTION

Accordingly, it is an object of the present invention to provide mirror means for a vehicle with which a driver can temporarily increase his field of view without disturbing the normal field of view.

It is also an object of the present invention to provide means which will allow the driver of a vehicle, particularly trucks and the like, to be able to see relatively low objects that are close to the side of the vehicle and just rearward the mirror.

These and other objects which will become apparent on a reading of the following specification and claims, are accomplished by way of an auxiliary mirror stored behind a main rearview outside mirror. The auxiliary mirror can be temporarily swiveled or slid into position adjacent the main mirror by driver operated means, providing a clear view of what was previously a blind spot while leaving the main outside rearview mirror in its original position.

In a preferred embodiment of the invention, the auxiliary mirror is convex. However, almost any type of mirror may be utilized.

BRIEF DESCRIPTION OF THE DRAWINGS

FIG. 1 is a side view of a truck with rearview mirror rays and a bicycle rider next to the truck;

FIG. 2 is a top view of FIG. 1;

FIG. 3 is a front view of a first embodiment of the invention with the auxiliary mirror in a working position;

FIG. 4 is a section view through line IV—IV according to FIG. 3;

FIG. 5 is a front view of a first embodiment of the invention with the auxiliary mirror stored behind the main mirror;

FIG. 6 is a side view of FIG. 5;

FIG. 8 shows a front view of a servo-motor and its relationship with a main outside rearview mirror and a stored auxiliary mirror according to the invention;

FIG. 9 shows a front view of the invention according to FIG. 8 with the auxiliary mirror in a working position;

FIG. 10 is a front section view of a third embodiment of the invention with the auxiliary mirror in a working position; and FIG. 11 is a side section view according to FIG. 10.

DETAILED DESCRIPTION OF THE PREFERRED EMBODIMENTS

Figure 7:
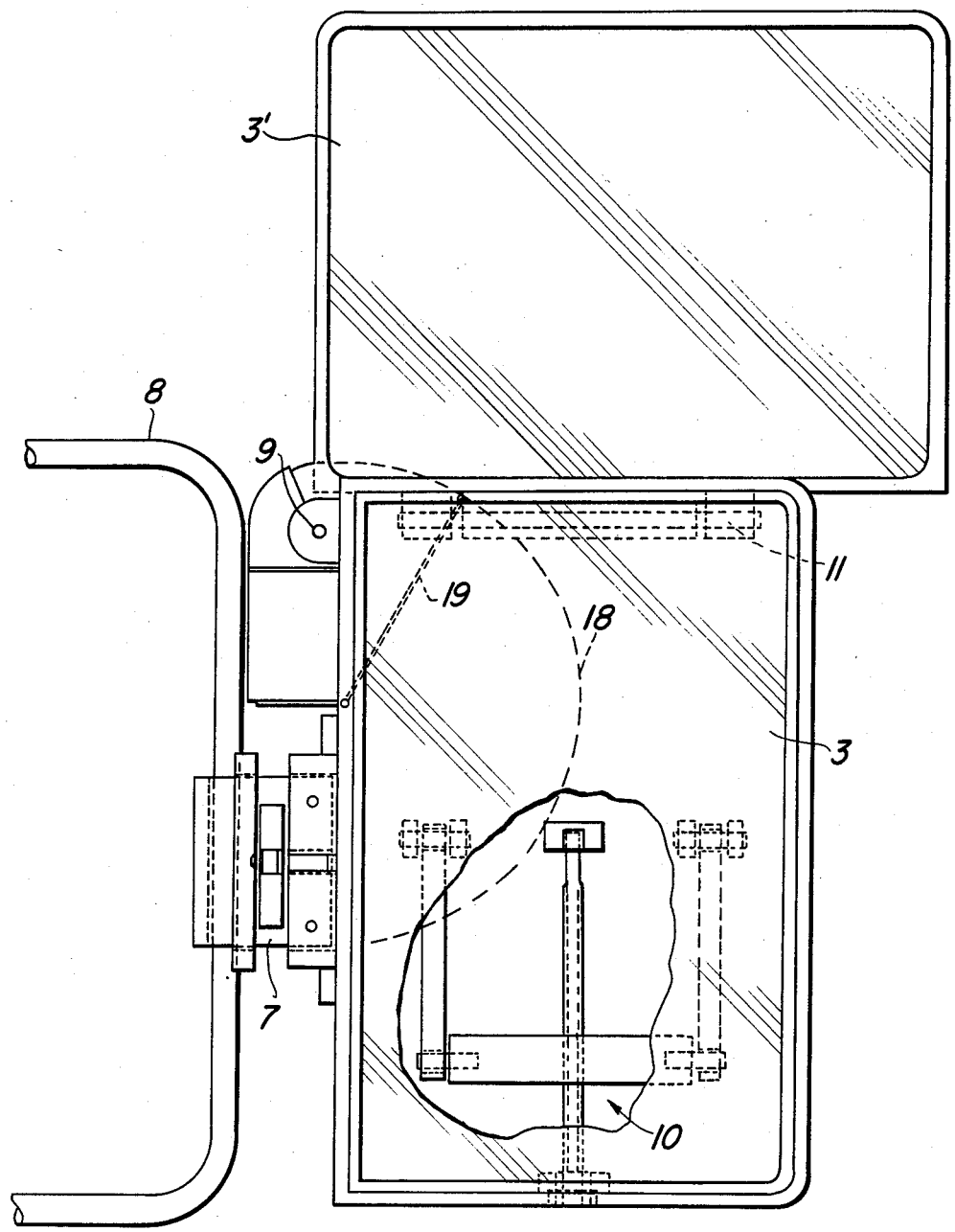
FIG. 7 is a front view of a second embodiment of the invention.

In the following specification and claims, specific terminology is utilized in the interest of clarity and a particular embodiment described in accordance with the requirements of 35 USC 112, but it is to be understood that the same is not intended to be limiting, as indeed the invention is capable of many variations within the scope of the appended claims.

Shown in FIGS. 1 and 2 are a truck 1, a bicycle rider 2, right outside mirror 3, and the head of the truck driver 4. In its normal position, the view rays of mirror 3 are indicated by rays 5a–5d. It can be seen that since view rays 5a–5d miss the bicycle 2, the driver cannot see bicycle rider 2 in mirror 3. According to the invention, a convex second mirror 3', which is normally stored behind mirror 3, can be brought into a working position beside mirror 3. The bicycle rider 2 falls within the field of the view rays 6a–6d of second mirror 3' in this working position, enabling the driver to see rider 2.

In FIG. 2, the truck's position after it has driven a certain distance around a curve is shown in dotted lines. The view rays of mirror 3 are indicated at 5c' and 5d', while the view rays of mirror 3' are at 6c' and 6d'.

It should be noted that in FIGS. 1 and 2 the view rays of mirror 3 and second mirror 3' merge to form a combined field of view in which there are no gaps or blind spots.

FIGS. 3–6 illustrate a first embodiment of the invention. In FIGS. 3 and 4 convex second mirror 3' has been swiveled into a working position underneath mirror 3, and in FIGS. 5 and 6 convex second mirror 3' is stored behind mirror 3. Mirror 3 is connected to a bow or bracket 8 by locking mechanism 7. Bow 8 is fastened to the truck. The bottom left corner of mirror 3 is provided with a joint 9 with which second mirror 3' is rotatably fastened to mirror 3. 10 comprises adjustment means for adjusting mirror 3 about a horizontal axis 11. Mirror 3 is also adjustable about a vertical axis running through locking means 7. A motor 12 rotates second mirror 3' by means of a worm drive (not shown) clockwise from its stored position to a working position below mirror 3 as shown in FIGS. 3 and 4, and then rotates it counterclockwise back to its original stored position behind mirror 3 as shown in FIGS. 5 and 6. Motor 12 may be actuated by the driver of the vehicle using any suitable mechanical or electrical means.

FIG. 7 shows a second embodiment of the invention, identical to the first embodiment of FIGS. 3–6, except that second mirror 3' is swiveled about a joint 9 in the upper left corner of mirror 3 from a rest to a working position above the mirror 3. This allows the driver to see objects that are further forward along the vehicle body than in the previous embodiment.

FIGS. 8 and 9 show means for swiveling or rotating second mirror 3'. In FIG. 8, the second mirror 3' is in its stored position behind mirror 3 (not shown), and in FIG. 9 second mirror 3' has been swiveled up to a working position above mirror 3 (not shown). Motor 12 effects the swiveling of second mirror 3' by way of a worm drive 13,14. 12, 13 and 14 are protected by slidably engageable curved cover portions 16 and 17. Cover 8 is capable of following the movement of second mirror 3'. A double switch 21 serves to shut off motor 12 when the second mirror 3' has reached either its stored or working position. In FIG. 8, a protruding end portion of cover 17 contacts the left side of switch 21 to turn the motor off in the stored position and, in FIG. 9, the bottom left corner of second mirror 3' contacts the right side of switch 21 to turn the motor off in the working position. Spring 19 is connected to second mirror 3' and to point 20 on the motor housing, which forces cover 18 into a swiveled position. Second mirror 3' forces cover 18 into its unswiveled position.

FIGS. 10 and 11 show a front and side view, respectively, of a third embodiment of the invention in which second mirror 3' slides down from a stored position behind mirror 3 into a working position underneath mirror 3. This is accomplished by means of motor 12 actuating worm drives 13,14 in a manner to cause thread rods 15 to rotate. Thread rods 15 engage correspondingly threaded channels 23 through a portion of second mirror body 25 to raise or lower second mirror 3' to and from its stored and working positions. Switches 21 serve to stop motor 12 after second mirror 3' has reached either its stored or working position.

The above specification is not to be construed in a limiting manner, and many variations of the aforementioned embodiments are possible within the scope of the invention.

OPERATION

It will be assumed that before use of the invention by a vehicle driver, second mirror 3' is in a stored position behind mirror 3. If, for example, a truck driver desired to use the invention to ensure that the area immediately adjacent the side of the truck was clear of obstacles such as bicycles, pedestrians, etc., he would merely have to actuate motor 12 to swivel or slide second mirror 3' into its working position to obtain a view of the desired area.

I claim:
1. A side rearview mirror for an automotive vehicle comprising:
   a first mirror mounted on said vehicle;
   a second mirror mounted in a stored position behind the first mirror;
   pivot means disposed proximate a corner of said first mirrors and connected between said first and second mirrors for pivoting said second mirror out from behind said first mirror into a use position adjacent the first mirror; drive means for operating said pivot means; and a housing for covering said pivot means and said drive means, said housing comprising a first portion connected to said first mirror and a second portion connected to said second mirror, said first mirror and a second portion connected to said second mirror, said first and second housing portions being arranged to pivot adjacent and relative to one another as said second mirror pivots relative to said first mirror between said stored and use positions.
2. Apparatus as defined in claim 1 wherein said second housing portion is operatively associated with said drive means to deactivate said drive means when the mirror reaches one of said positions.
3. Apparatus as defined in claim 1 wherein said drive means comprises an electric motor and a worm gear.

* * * * *